(12) United States Patent
Saeed et al.

(10) Patent No.: US 7,922,784 B2
(45) Date of Patent: Apr. 12, 2011

(54) SYSTEM FOR INERTIAL PARTICLES SEPARATION

(75) Inventors: Farooq Saeed, Dhahran (SA); Ahmed Al-Garni, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 234 days.

(21) Appl. No.: 12/382,738

(22) Filed: Mar. 23, 2009

(65) Prior Publication Data

US 2010/0236200 A1  Sep. 23, 2010

(51) Int. Cl.
*B01D 45/12* (2006.01)
*G01N 1/00* (2006.01)

(52) U.S. Cl. .................. 55/440; 73/28.05; 73/863.22

(58) Field of Classification Search .............. 55/434, 55/440, 462; 73/28.05, 863.22
See application file for complete search history.

(56) References Cited

U.S. PATENT DOCUMENTS

| | | |
|---|---|---|
| 2,634,821 A | 8/1947 | Chipley |
| 2,580,655 A | 1/1952 | Chipley |
| 2,979,287 A | 4/1961 | Ross |
| 3,385,037 A | 2/1966 | Farr et al. |
| 3,540,073 A | 11/1970 | Issenmann et al. |
| 4,144,041 A * | 3/1979 | Hou ................................ 96/261 |
| 4,222,858 A | 9/1980 | Avila et al. |
| 5,039,317 A | 8/1991 | Thompson et al. |
| 5,505,434 A | 4/1996 | Lilja et al. |
| 6,199,796 B1 | 3/2001 | Reinhard et al. |
| 6,347,769 B1 | 2/2002 | To et al. |
| 6,383,263 B1 | 5/2002 | Dullien |
| 6,910,661 B2 | 6/2005 | Dockter et al. |
| 2008/0152500 A1 | 6/2008 | Mehring |
| 2009/0223279 A1* | 9/2009 | McFarland et al. .......... 73/28.05 |

FOREIGN PATENT DOCUMENTS

| | | |
|---|---|---|
| EP | 1068890 A1 | 1/2001 |
| JP | 2008088977 A | 4/2008 |

* cited by examiner

*Primary Examiner* — Robert A Hopkins
(74) *Attorney, Agent, or Firm* — Richard C. Litman

(57) ABSTRACT

The system for inertial particle separation removes particulate matter, such as sand, from an air stream, such as that drawn into a turbine engine. The system includes first and second walls spaced apart and positioned within a housing of the turbine engine. The first wall is in the form of an airfoil with variable geometry. An annular air flow path is defined between the first and second walls. The air flow path leads inwardly from an ambient inlet and turns to an outlet. A splitter member is positioned between the first and second walls. A scavenge flow path is defined between the splitter member and the first wall. An inlet thereof is in communication with the ambient inlet, and a filtered flow path is defined between the splitter member and the second wall. The splitter member is also in the form of an airfoil having a variable geometry.

5 Claims, 4 Drawing Sheets

SYSTEM FOR INERTIAL PARTICLES SEPARATION

BACKGROUND OF THE INVENTION

1. Field of the Invention

The present invention relates to filtering systems, and particularly to a system for inertial particle separation that is provided for removing particulate matter, such as sand, from an air stream, such as that drawn into a helicopter turbine engine.

2. Description of the Related Art

In a typical desert environment, the ambient air is often filled with sand and dust particles. The operational performance and life of any mechanical equipment, such as air ingestion systems of turbine engines, air-conditioning systems, air-breathing engines or the like, which are designed to operate in such a harsh environment, is greatly influenced by the presence of sand and dust. Any such equipment operating under such conditions for long periods is vulnerable to internal system and/or engine damage.

For example, the operational life of a helicopter's engine operating in sandy environments can be as short as fifty hours. Internal engine damage can range from simple erosion in the engine blades to a completely inoperative engine with as little as half a pound of sand. Even without mechanical damage, degradation of the performance and efficiency of the aircraft's engine leads to increases in fuel consumption, and in operational and maintenance costs. Thus, it is desirable that some form of protection be provided at the engine inlet to prevent sand from entering the engine. Typically, the device used to prevent sand ingestion in mechanical systems is an inertial particle separator (IPS) system.

Inertial particle separator systems were initially developed for use with helicopters. FIG. 2A illustrates a typical prior art radial or inertial particle separator used with a conventional turbine engine 100, which includes a housing 112, such as is often found in helicopters. The housing 112 defines an annular inlet 114, which is substantially continuous circumferentially, and which extends radially inward to form a flow path 116. A rotor 118 is journaled in the housing 112 and cooperates therewith to form the flow path 116.

The flow path 116 first leads to a compressor portion 120 of the rotor member 118. Rotation of the rotor member 118 causes the compressor portion 120 to induct ambient air via the inlet 114, and to deliver this pressurized air to a pressurized air plenum 122 of the flow path 116, as indicated by air flow arrows 124. A combustor structure 126 (partially shown in FIG. 2A) is disposed in the pressurized air plenum 122. Pressurized air flows from the plenum 122 through perforate portions of the combustor structure 126 into a combustion cavity 128, where it is then mixed with fuel to sustain combustion.

The combustor structure 126 defines a part of the flow path 116, and the pressurized high-temperature combustion products produced therein flow via a combustor exit 130 to a turbine portion 132 of the rotor member 118, as indicated by arrows 134. The turbine portion 132 expands the combustion products towards ambient pressure to extract mechanical power therefrom. The turbine portion 132 drives the rotor 118, including both the compressor portion 120, and a protruding power output shaft portion 136. From the turbine portion 132, the combustion products flow via a concluding portion of the flow, path 116, and are exhausted to ambient air via an outlet 138.

As shown in FIG. 2B, the IPS 140 defines the inlet 114 and initial parts of the flow path 116 preceding the compressor portion 120 of rotor 118. The IPS 140 includes a pair of axially and radially spaced wall portions 142, 144 of the housing 112. The walls 142, 144 cooperatively define the initial portion of the flow path 116 leading radially inward from inlet 114.

Proceeding radially inward from the inlet 114, the wall 142 defines an axially convex surface portion 146 leading axially and radially inwardly to a generally radially extending and slightly axially convex surface portion 148. The wall 142 continues radially inwardly from convex portion 148 in a radially extending, axially convex surface portion 150, which reverses the axial direction of the wall 142; i.e., the surface portion 150 of wall 142 defines an axial prominence protruding toward the wall 144. Further, the wall portion 150 leads into a recess or concavity 152, and introduces a further curvature into the wall 142. From the wall surface portion 150, wall 142 defines a surface portion 154 extending radially inward and axially forward into the recess 152. Radially inward of the surface portion 154, the wall 142 reverses its direction of curvature, and has a surface portion 156 that is axially concave. The axially concave surface portion 156 of wall 142 continues radially inward and turns from the radial direction to proceed axially rearward. The radially innermost extent of flow path 116 is bounded at the compressor portion 120.

Extending in axially spaced and confronting relation with the wall 142, the wall 144 includes an axially extending, radially outward surface portion 158. The surface portion 158 cooperates with a radially extending, generally concave or conical surface portion 160 to define a circumferentially continuous axial prominence 162. The prominence 162 is disposed radially outward of prominence 150 of the wall 142, and extends in the opposite axial direction. At the prominence 162, the wall 142 defines a relatively sharp bend radius 164. The surface portion 160 extends radially inward and axially rearward with a gradual concave curvature to cooperate at 165 with the wall 142 in defining an annular throat; i.e., at the annular throat referenced with 165, the walls 142 and 144 cooperatively define the minimum cross-sectional area of flow path 116 that is available for radial inflow of air in the separator 140.

Radially inward of the throat 165, the wall 144 includes a surface portion 168 extending radially inward and curving axially forward in a direction opposite to the axial concavity of wall surface portion 160; i.e., the surface portion 168 curves axially out of the recess defined by surface portion 164. Further, downstream of throat 165, the surfaces 154 and 168 axially diverge to increase the flow area of flow path 116, despite the radially inward flow direction. At 170, the surface of wall 144 reverses in curvature to introduce a further curvature, and the surface portion 172 of wall 144 leads generally axially into a scavenge cavity 174.

In the region of recess 152, a radially and axially extending annular splitter member 176 is disposed in spaced relation between the walls 142 and 144. The splitter member 176 generally confronts the surface portions 154 and 156 of wall 142 to locally bound the flow path 116 in cooperation therewith. Further, the splitter member 176 confronts the surface portions 170 and 172 of the wall 144 to bound a radially inward and axially rearward extending scavenge flow path 178, which communicates with the scavenge cavity 174.

The splitter member 176 includes an annular surface line portion, or splitter line 180 confronting the inlet 114 and air flow entering via the flow path 116. The line surface portion 180 designates the line of demarcation where air flow continuing in the path 116 separates from air flow continuing via flow path 178 into scavenge cavity 174. Downstream of the splitter line 180, an annularly arrayed plurality of scavenge flow turning vanes 182 extend axially between wall 144 and the splitter member 176. The vanes 182 connect axially and radially between the wall 144 and splitter member 176, and extend from a position spaced downstream of the splitter line 180 toward the scavenge cavity 174 with a circumferential curvature. The vanes 182 turn air flow in flow path 178 from a radially inward and axial direction to a circumferential direction for introduction to cavity 174.

Once past, or radially inward, of the throat 165, the walls 142 and 144 diverge to increase the fluid flow cross-sectional area despite the decreased radial dimension, and to introduce a further curvature into the flow path 116 (shown by arrow 300 in FIG. 2B). The result of the increase of fluid flow cross-sectional area is a decrease of air flow velocity at the same time that the air experiences a deviation in flow direction, or reversal of direction in the axial sense. In this curving and decelerating air flow, fine dust particles attempt to follow the air flow, but are momentarily prevented from doing so by their own high velocity and momentum. Thus, the fine particulate material deviates from flow path 116 and continues generally along a straight path to enter the scavenge flow path 178, to the right of the splitter line 180. The smaller sand grains that have not achieved parity with the air flow velocity at throat 165 are also much slower to follow the turning air flow, and also enter scavenge flow path 178.

Larger particulates, such as large sand grains and small pebbles, are not affected nearly to the same extent as the small particles in the accelerating air flow outwardly of throat 165, nor in the decelerating and curving air flow radially inwardly of throat 165. Because of their weight, these particles follow a substantially straight line path. Thus, the separator 140 provides a mechanism for ensuring delivery of these particulates into the scavenge flow path 178.

With reference to FIG. 2B, it should be noted that a straight radial line from prominence 162 tangent at prominence 150 (represented by arrow 302) falls into the flow path 178 clear of the splitter line 180. The arrow 302 indicates that, on the basis of a straight line trajectory, a particle entering inlet 114 by grazing, but not rebounding from prominence 162, and proceeding to graze but not rebound from prominence 150, will travel into the scavenge flow path 178. There may be some slight curvature of the trajectory represented by arrow 302 toward separating line 180 radially inward of throat 166 because the air flow 300 deviates along flow path 116 and is somewhat transverse to the trajectory arrow 302 over a short distance. Nevertheless, the particle will travel into the scavenge flow path 178. The straight line arrow 302 also represents a line of sight radially into the separator 140. Thus, the splitter line 180 of splitter 176 is not visible looking into the separator 140. The cooperating axially opposed and radially spaced prominences 162 and 150 allow only the scavenge flow path 178 to be viewed looking into the separator 140.

Two alternative exemplary particle trajectories into the separator 140 are represented by respective trajectory arrows 304a, 304b, and 304c with particle 306, and arrows 308a and 308b with particle 310. Considering first the trajectory of particle 306, it should be noted that the particle 306 enters inlet 114 purely radially, or with a slight axial angulation toward wall 142 (segment 304a), to first impact and rebound from the convex surface portion 148 of this wall. Because the surface portion 148 is convex, it bounces particle 306 toward wall 144 (segment 304b).

While irregularities of the particle shape, as well as the material properties of wall 148, affect rebound of the particle 306, the rebound trajectory from surface 148 (arrow 304b) can be expected to have approximately equal angles of incidence and departure. However, the trajectory portion represented by arrow 304b traverses the flow path 116 toward wall 144 so that any curvature introduced into the trajectory by the air flow, which is accelerating somewhat transversely to the path of the particle 306, reduces the angle of incidence at wall 144. When the particle 306 does impact the wall 144, the angle of departure (arrow 304c) is significantly less than the angle of incidence because of the concavity of surface portion 160 and the nature of wall 144 itself.

Subsequent to the impact of particle 306 with wall 144, the particle will be on the side of an imaginary capture boundary, represented by dashed line 312, extending radially outward from splitter line 180; i.e., because of its shallow angle of rebound from the wall 144, the particle 306 remains close enough to this wall that it inevitably enters the scavenge flow path 178. The capture boundary 312 extends outwardly from line 180 through the flow path 116 to inlet 114, and is positioned axially at each radial station, based upon maintaining the same proportion of area on each side with respect to the walls 142, 144 as that which exists at line 180.

The other alternative rebound trajectory is illustrated by arrows 308a, 308b and particle 310. In this case, the particle enters inlet 114 radially inwardly and with an axial angulation resulting in impact first with wall 144 (segment 308a). As noted above with respect to the trajectory of particle 306, the concavity of the surface portion 160 of wall 144 and the nature of the wall itself results in a shallow angle of bounce or departure of particle 310 from the wall 144 (segment 308b). Thus, the particle 310 proceeds to scavenge flow path 178, either directly or with additional rebounds from wall 144. It should be noted that the walls 142 and 144, by their convex and concave cooperative curvature, and the low-rebound nature of wall 144, move particles to the capture side of boundary 312, and generally prevent escape of particles from this capture side of the imaginary boundary.

An additional feature in the rebound control of particles in the separator 140 is represented by the recessing of flow distribution vanes 182 significantly radially inward of the splitter line 180. Consequently, as particles enter the scavenge flow path 178, any bouncing of particles from the vanes 182 occurs deeply enough in the scavenge flow path 178 that bouncing particles do not escape into flow path 116.

An exemplary radial particle separator is shown in U.S. Pat. No. 5,039,317, which is hereby incorporated by reference in its entirety. In the above-described system, the walls and, thus, the flow path are rigid and unchanging. However, since the helicopter engine may have to operate at different speeds as well as in differing environments (with different sand particle sizes to consider), the need to have optimum geometric shapes or airfoil profiles for varying operational and environmental conditions becomes imperative.

As noted above, the main design requirements of such a system are the separation of particles (such as sand, dust, water droplets, and the like) from the air entering the engine, while keeping the mass flow rate entering at the inlet as desired. The separation can be achieved by the specific geometric design of wall curvature or internal airfoil profiles that define the internal flow path of these systems. Large particles entering these flow paths get separated from the air solely due to their inertia. No form of mechanical or electrical power is used as a part of such systems, which keeps the engine performance unaffected. Since the helicopter may be required to operate under different operational and environmental conditions, the specific geometric design of airfoil profiles that define the internal flow path of these systems must be redefined in real time. Thus, a system for inertial particle separation solving the aforementioned problems is desired.

SUMMARY OF THE INVENTION

The system for inertial particle separation removes particulate matter, such as sand, from an air stream, such as that drawn into a helicopter turbine engine. The system includes first and second walls co-axially and radially spaced apart and positioned within an outer housing of the turbine engine or the like. The first wall is preferably in the form of an airfoil mounted within the outer housing, and the second wall is preferably defined by the outer wall of the central engine hub. An annular main air flow path is defined between the first and second walls, with the annular air flow path leading radially inward from a main air inlet and turning axially to an outlet.

A radially and axially extending splitter member is positioned between the first and second walls substantially at the turning of the main air flow path. A scavenge flow path is defined between the splitter member and the first wall. The scavenge flow path is separated from the main air flow path by the splitter member. An annular inlet of the scavenge flow path is in communication with the main air inlet, and a filtered flow path is defined between the splitter member and the second wall. The splitter member is also preferably provided in the form of an airfoil.

A scavenge cavity is positioned between the first wall and the splitter member for collecting the particulate debris. The scavenge flow path leads into the scavenge cavity. In use, particulate matter is separated from the ambient air drawn into the main air inlet and is collected in the scavenge cavity. The filtered air follows the filtered flow path through the outlet and into the turbine engine.

The curvatures of the first wall and the splitter member are selectively and controllably variable. Since the helicopter may be required to operate under different operational and environmental conditions, the specific geometric design of the airfoil profiles that defines the internal flow paths of the system may be redefined in real time. This is accomplished by employing surface morphing and flow suction techniques that allow the system to alter the sand particle trajectories, as well as flow streamlines to prevent particles from entering the aircraft engine inlet (joined to the outlet of the air flow), resulting in better performance and longer operational life of the engine.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
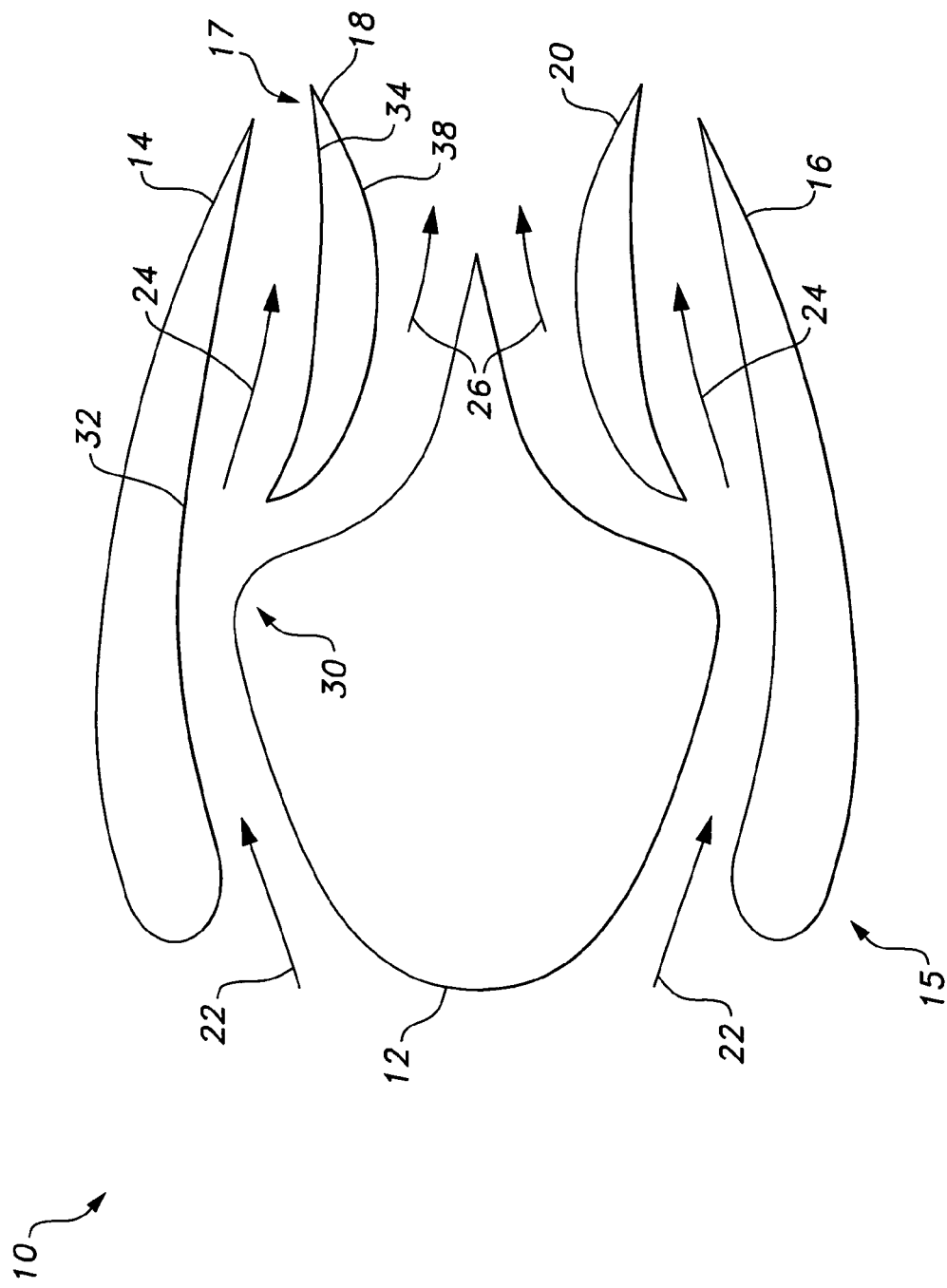
FIG. 1 is diagrammatic view of a system for inertial particle separation according to the present invention.

FIG. 1 diagrammatically shows a system for inertial particle separation, designated generally as 10 in the drawing, illustrated for an axial air flow turbine engine of the like. The system 10 removes particulate matter, such as sand, from an air stream, such as that drawn into a helicopter turbine engine.

Figure 2A:
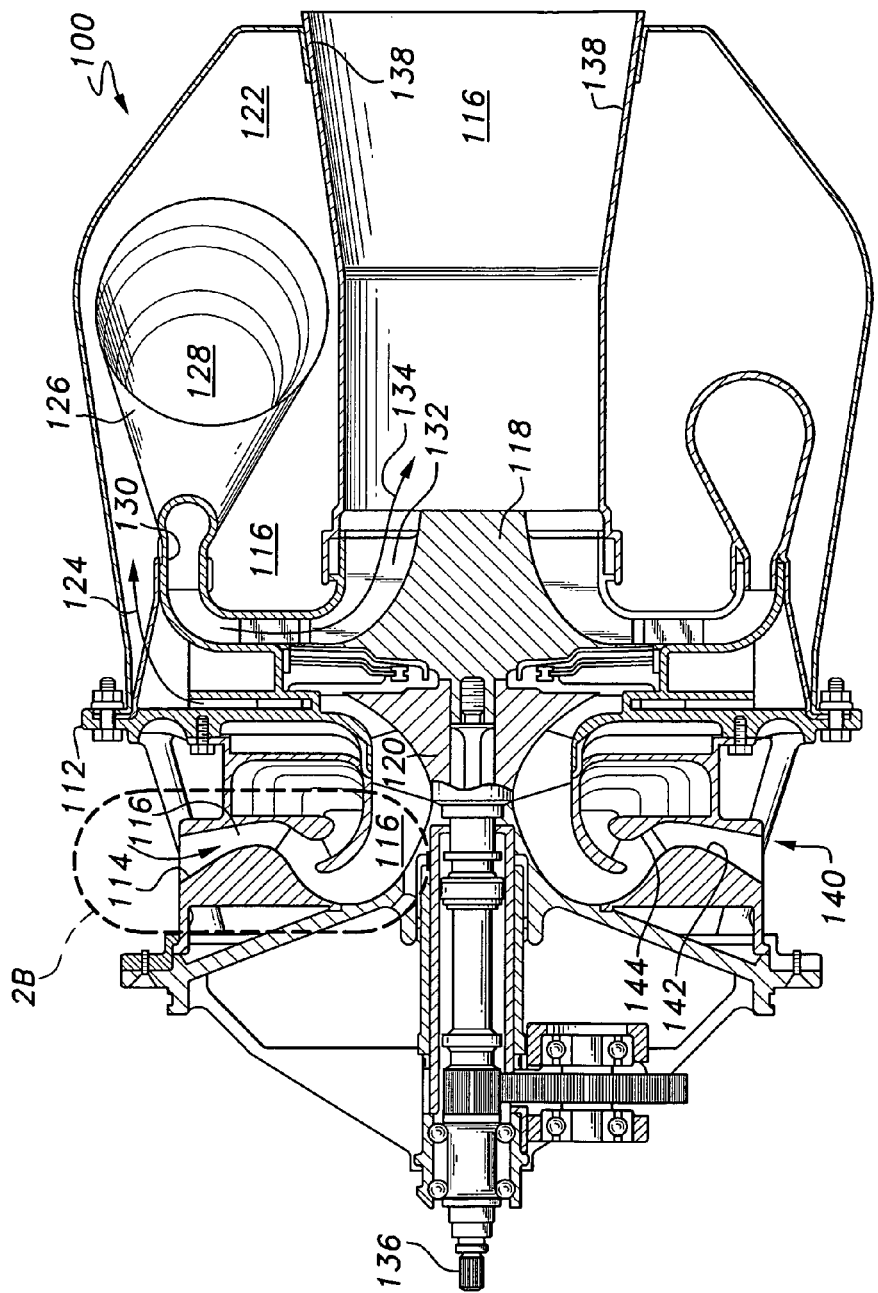
FIG. 2A is a section view of a prior art particle separation system.
Figure 2B:
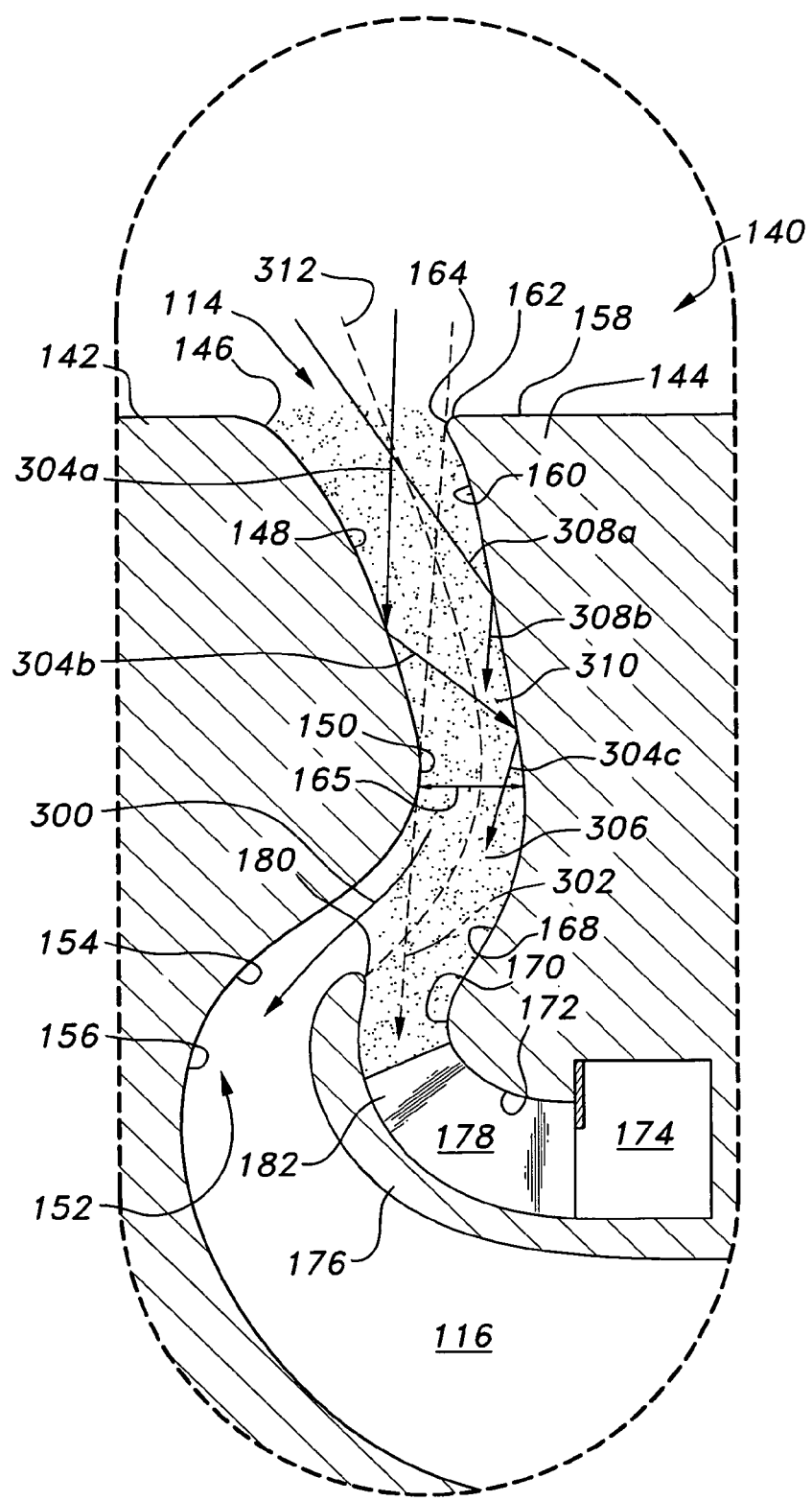
FIG. 2B is a detailed section view of area 2B of the prior art system of FIG. 2A.

The system 10 includes first and second walls 32, coaxially and radially spaced apart, and positioned within an outer housing of the turbine engine or the like. As shown, first wall 32 is formed as an internal face of airfoil member 14, and second wall 30 is preferably defined by the outer wall of a hub 12. The following discussion will be directed towards only the upper airfoil member 14 in relation to central hub 12, in a manner similar to the focus of FIG. 2B. As in FIG. 2A, there are a pair of symmetric air flow channels, with the lower air flow being defined by a second, lower symmetric airfoil member 16, identical to upper airfoil member 14. Preferably, the cross-section illustrated in FIG. 1 represents an annular member encircling central hub 12. Thus, airfoil member 14 and airfoil member 16 are simply upper and lower cross-sectional slices of an overall annular member 15, having an airfoil cross-sectional contour.

As shown, an annular air flow path is defined between the first and second walls 32, 30. The annular air flow path 26 extends from an ambient inlet 22 axially rearward to an outlet (which is joined to the inlet of the turbine engine, neither of which are shown in the simplified diagrammatic view of FIG. 1).

A splitter member 18 is positioned between the first and second walls 32, 30 substantially at the turning of the flow path. As described above with regard to airfoil members 14, 16, a lower, symmetric splitter member 20 is also positioned between the central hub 12 and the lower airfoil member 16, defining an identical, lower air flow path. As described above with regard to airfoil member 14, 16, preferably, the cross-section illustrated in FIG. 1 represents an annular member encircling central hub 12, thus splitter member 18 and splitter member 20 are simply upper and lower cross-sectional slices of an overall annular member 17, having an airfoil cross-sectional contour.

The main air flow path proceeds, from the ambient inlet 22 in a radially outward and axially rearward direction around a convex prominence formed by second wall 30 of hub 12, then radially inward and axially rearward in a passage 26 defined by a concave recess formed by wall 30 of hub 12 and a convex, radially inward curvature of inner face 38 of splitter member 18. A scavenge flow path 24 is defined between the outer, concave face 34 of splitter member 18 and the slightly concave inner face of first wall 32. The scavenge flow path 24 is separated from the air flow path 26 by the body of splitter member 18. An annular inlet thereof is in communication with the ambient inlet 22, and a filtered main air flow path 26 is defined between the splitter member 18 and the second wall 30. The splitter member 18 is also preferably provided in the form of an airfoil having opposed outer and inner faces 34, 38.

A scavenge cavity is positioned between the first wall 32 and the splitter member 18 for collecting the particulate debris. The scavenge cavity is not shown in the simplified diagrammatic view of FIG. 1, but is preferably similar in design and position to scavenge cavity 74 of FIG. 2B. The scavenge flow path 24 leads into the scavenge cavity. In use, particulate matter is separated from the ambient air drawn into the ambient inlet 22 and is collected in the scavenge cavity. The filtered air follows the filtered flow path 26 through the outlet and into the turbine engine.

The curvatures of the first wall 32 and the splitter member 18 are selectively and controllably alterable. Since the helicopter may be required to operate under different operational and environmental conditions, the specific geometric designs of airfoil profiles that define the internal flow paths of the system are able to be redefined in real time. This is accomplished by employing surface morphing and flow suction techniques that allow the system to controllably alter the sand particle trajectories, as well as flow streamlines to prevent particles from entering the aircraft engine inlet (joined to the outlet of the air flow), resulting in better performance and longer operational life of the engine.

Figure 3:
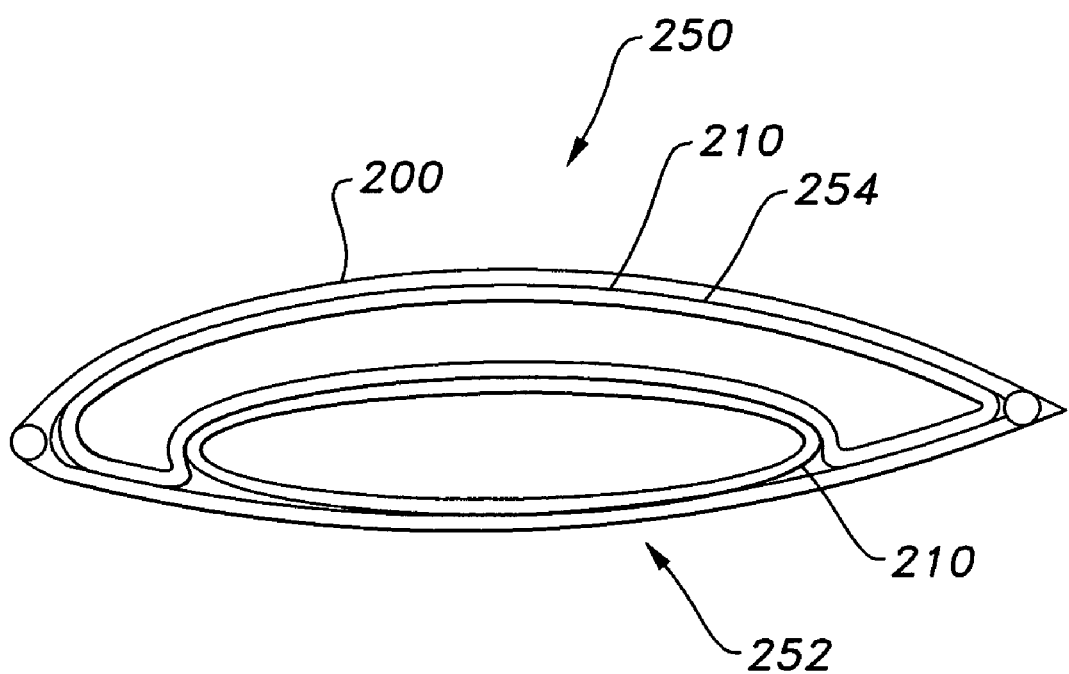
FIG. 3 is a simplified, cross-sectional view of a prior art airfoil with a variable surface geometry.

Airfoils having a variable geometry are well-known. As shown in FIG. 3, one such prior art morphing airfoil or wing 200 includes multiple inflatable members 210. The distribution and quantity of inflatable members 210, along with flexible materials contained both within the airfoil and without, may be varied throughout the airfoil 200 to allow for a change in camber of the morphing airfoil 200. An upper portion 250 of the morphing airfoil 200 is altered differently than a lower portion 252 of the airfoil 200 by applying an increased amount of pressure in an upper inflatable member 254, thus adjusting camber. One such variably controllable airfoil is shown in U.S. Pat. No. 6,910,661, which is hereby incorporated by reference in its entirety.

As noted above, airfoil members 14, 16, and splitter members 18, 20, are in the form of airfoils having variable and controllable geometries, thus allowing the system to controllably alter the sand particle trajectories, as well as flow streamlines to prevent particles from entering the aircraft engine inlet.

It is to be understood that the present invention is not limited to the embodiments described above, but encompasses any and all embodiments within the scope of the following claims.

We claim:

1. A system for inertial particle separation, comprising:
    an outer first wall and an inner second wall coaxially and radially spaced apart from each other to define an annular main air flow path therebetween, the main air flow path extending from an ambient inlet to an outlet, the main air flow path extending radially outward and axially rearward from the ambient inlet and then curving radially inward and axially rearward to the outlet, said outer first wall defining an airfoil;
    means for selectively and controllably altering curvature of the first wall;
    a splitter member positioned between the first and second walls substantially at the radially inward curvature in the main air flow path, the splitter member extending axially rearward towards the outlet, the splitter member and the first wall defining a scavenge flow path and a scavenge cavity therebetween; and
    means for selectively and controllably altering curvature of said splitter member;
    whereby particulate matter entrained in air entering the ambient inlet is drawn into the scavenge flow path and scavenge cavity by inertia, thereby filtering the particulate matter from the main air flow path.

2. The system for inertial particle separation as recited in claim 1, wherein said splitter member defines an airfoil.

3. A system for inertial particle separation, comprising:
    an annular outer first wall and a hub defining an inner second wall, the first and second walls being coaxially and radially spaced apart to define an annular main air flow path therebetween, the main air flow path extending from an ambient inlet to an outlet, the main air flow path extending radially outward and axially rearward from the ambient inlet and then curving radially inward and axially rearward to the outlet, the first wall having a generally convex outer face and a generally concave inner face defining an airfoil;
    means for selectively and controllably variably altering curvature of the first wall;
    an annular splitter member disposed between the first and second walls and extending substantially from the radially inward curvature of the main air flow path to the outlet, the first wall and the splitter member defining a scavenge flow path therebetween;
    whereby particulate matter entrained in air entering the ambient inlet is drawn into the scavenge flow path by inertia, thereby filtering the particulate matter from the main air flow path.

4. The system for inertial particle separation as recited in claim 3, further comprising means for selectively and controllably altering curvature of said splitter member.

5. The system for inertial particle separation as recited in claim 4, wherein said splitter member defines an airfoil.

* * * * *